United States Patent
Givehchi et al.

(10) Patent No.: US 11,075,807 B2
(45) Date of Patent: Jul. 27, 2021

(54) METHOD FOR REPLACING AND/OR CLONING AT LEAST SOME DEVICES OF A MACHINE

(71) Applicant: Schneider Electric Industries SAS, Rueil-Malmaison (FR)

(72) Inventors: Omid Givehchi, Aschaffenburg (DE); Christian Platzer, Würzburg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 15/991,378

(22) Filed: May 29, 2018

(65) Prior Publication Data

US 2018/0351803 A1   Dec. 6, 2018

(30) Foreign Application Priority Data

May 30, 2017   (EP) .................................... 17305625

(51) Int. Cl.
*G06F 15/177*   (2006.01)
*H04L 12/24*   (2006.01)
(Continued)

(52) U.S. Cl.
CPC ...... *H04L 41/0846* (2013.01); *G05B 19/0426* (2013.01); *H04L 41/0816* (2013.01);
(Continued)

(58) Field of Classification Search
CPC . H04L 41/0846; H04L 41/12; H04L 41/0816; H04L 67/30; H04L 67/12;
(Continued)

(56) References Cited

U.S. PATENT DOCUMENTS

| | | | |
|---|---|---|---|
| 8,799,800 B2 | 8/2014 | Hood et al. | |
| 2002/0046266 A1* | 4/2002 | Muralidhar | G05B 19/0426 709/220 |

(Continued)

FOREIGN PATENT DOCUMENTS

EP   1 688 840 A2   8/2006

OTHER PUBLICATIONS

Siemens; SIMATIC S&-1200 Easy Book Manual; Jan. 2015; Section 9 "Web server for easy Internet connectivity." (Year: 2015).*

(Continued)

*Primary Examiner* — Richard G Keehn
(74) *Attorney, Agent, or Firm* — Oblon, McClelland, Maier & Neustadt, L.L.P.

(57) ABSTRACT

The present invention relates to a method for replacing and/or cloning at least some devices of a machine, the machine comprising several cooperating devices, wherein
 a root device is used, which comprises a data connection to the cooperating devices,
 the root device comprises a data model which comprises configuration information of at least some of the cooperating devices,
wherein the method comprises
 performing a discovery with the root device using different communication protocols for detecting at least some of the cooperating devices,
 gathering the configuration information of at least some of the detected devices and storing the configuration information in the data model,
 transferring at least part of the configuration information onto a new device.

16 Claims, 4 Drawing Sheets

Figure 1:
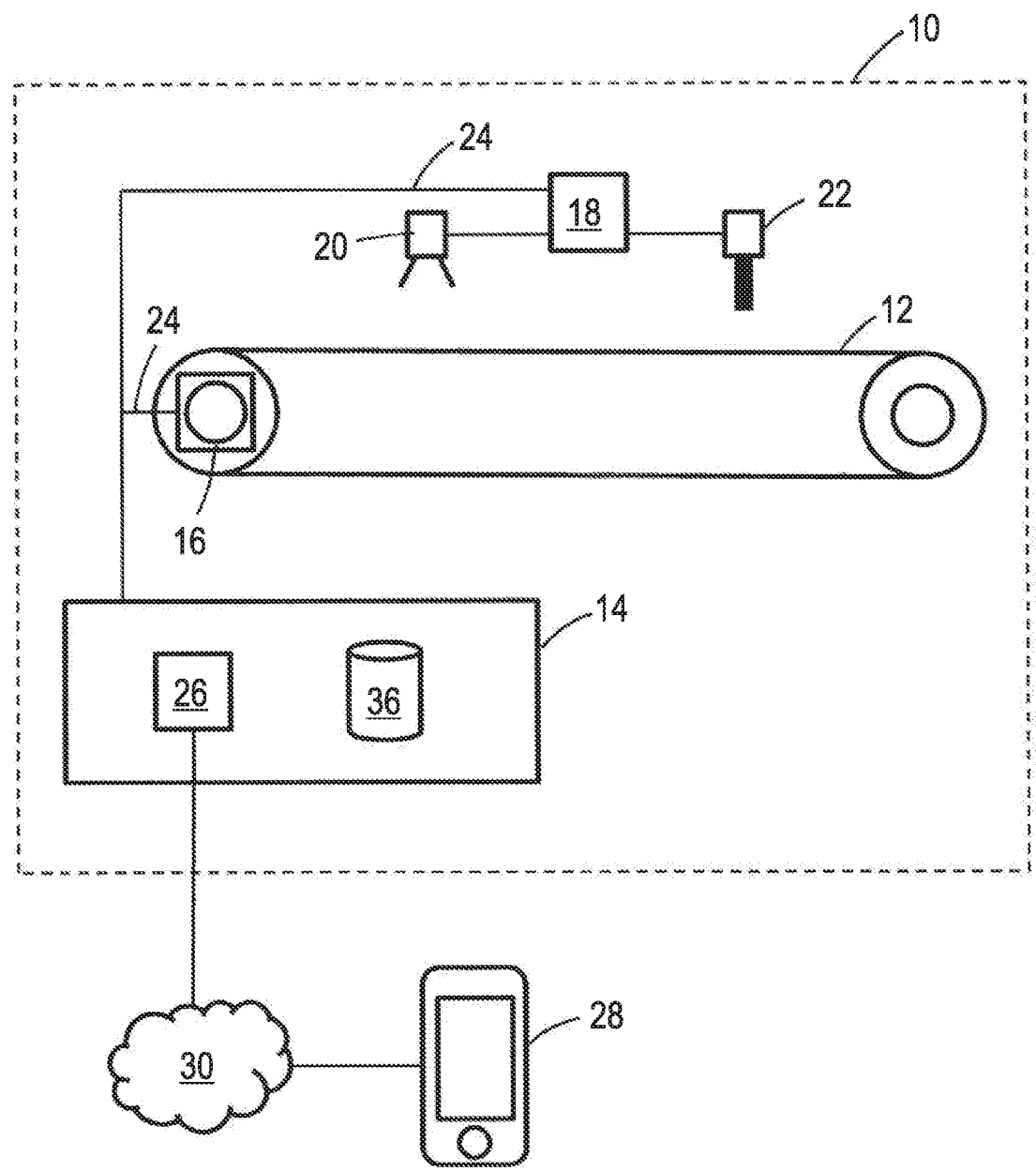

(51) Int. Cl.
 G05B 19/042 (2006.01)
 H04L 29/08 (2006.01)
 G05B 19/04 (2006.01)
(52) U.S. Cl.
 CPC .............. *H04L 41/12* (2013.01); *H04L 67/02* (2013.01); *H04L 67/1061* (2013.01); *H04L 67/12* (2013.01); *H04L 67/30* (2013.01); *G05B 19/04* (2013.01)
(58) Field of Classification Search
 CPC . H04L 67/1061; H04L 67/02; G05B 19/0426; G05B 19/04
 See application file for complete search history.

(56) References Cited

U.S. PATENT DOCUMENTS

| | | | |
|---|---|---|---|
| 2005/0107898 A1* | 5/2005 | Gannon | G06F 21/105 700/90 |
| 2006/0178757 A1 | 8/2006 | Grgic et al. | |
| 2007/0073912 A1* | 3/2007 | Ozaki | G05B 19/054 710/8 |
| 2007/0136485 A1* | 6/2007 | Mitsui | G06F 9/4411 709/230 |
| 2015/0066979 A1* | 3/2015 | Zhang | H04L 41/50 709/223 |
| 2016/0283427 A1* | 9/2016 | Chaudhari | H04L 61/2038 |
| 2016/0333854 A1 | 11/2016 | Lund et al. | |
| 2017/0185594 A1* | 6/2017 | Schulz | G06Q 10/06 |
| 2018/0060105 A1* | 3/2018 | Shimizu | G06F 9/45558 |
| 2018/0335971 A1* | 11/2018 | Borikar | G06F 3/0611 |

OTHER PUBLICATIONS

Rockwell Automation; "Allen Bradley EtherNet/IP Web Server Module"; Oct. 2006. (Year: 2006).*
Extended European Search Report dated Dec. 5, 2017 in Patent Application No. 17305625.0, 7 pages.

* cited by examiner

METHOD FOR REPLACING AND/OR CLONING AT LEAST SOME DEVICES OF A MACHINE

The present invention relates to a method for replacing and/or cloning of at least some devices of a machine.

Industrial processes become more and more automated and are often used to e.g. produce a certain product. The production or assembly of a product is usually performed by a complex machine. The machine itself comprises several devices which cooperate to execute the function of the machine. The cooperating devices can be e.g. Programmable Logic Controllers (PLCs), actuators, sensors and the like. For example, one PLC can be used to control the function of the machine and to process the information gathered by the sensors and to control the actuators to facilitate the production or assembly of the product.

During the lifespan of such a machine, it can be necessary to replace some of the devices of the machine, e.g. due to failures of the devices. Alternatively or additionally it can be required to clone at least some of the devices of the machine (or the complete machine), for example in order to expand production capacity by adding one or more new production lines for a specific product.

In order to replace or clone devices of the machine, it is necessary to transmit parameters and/or information about the "previous" cooperating device to a "new" device (i.e. the device that is intended to replace one of the existing devices). This information can for example comprise parameters that have been found to work best in a specific production environment. The transfer of these parameters is usually performed by a technician who reads out the parameters of the previous device and transfers them to the new device. Due to the various different types of devices used in the machine, different software for the different devices is usually required to read out the desired information from the old/existing devices. Consequently, this process requires a significant amount of time and effort and conventionally is basically a sequence of manual steps.

It is the object of the present invention to provide a method for replacing and/or cloning at least some devices of a machine that facilitates an easier and faster replacement and/or cloning of devices.

This object is achieved by a method having the features of claim 1.

Particularly, this object is satisfied by a method for replacing and/or cloning at least some devices of a machine. The machine comprises several cooperating devices, wherein a root device is used, which comprises a data connection to the cooperating devices, and the root device comprises a data model which comprises configuration information of at least some of the cooperating devices.

The method of the invention comprises preferably performing a discovery of devices with the root device, further preferably using two or more different communication protocols, for detecting at least some of the cooperating devices, advantageously gathering the configuration information of at least some of the detected devices and storing the configuration information in the data model, transferring at least parts of the configuration information onto a new device.

According to the invention, configuration information may be first gathered from several existing cooperating devices and stored in the data model. In order to allow the configuration information to be retrieved from different cooperating devices, preferably different protocols or communication protocols and/or standards are used. For example, first one or more field bus protocols such as Profibus, ControlNet, Sercos III, Profinet and/or Ethernet/IP can be used, followed e.g. by the use of the DPWS standard (Device Profile for Web Services). Due to the use of different standards and protocols, a large number of different cooperating devices and even devices that are based on different technologies can be detected/discovered. Also, the different communication protocols allow to correctly identify the cooperating devices remotely. Thereby, the method of the invention can work vendor independent and thus allow a straightforward detection of the cooperating devices.

The communication protocol that is used to discover a specific cooperating device can also be used to transfer the configuration information from the discovered device to the root device. Also, the same communication protocol can further be used to transfer the configuration information from the root device to the new device. Alternatively different protocols can be used for discovering devices and for transferring the configuration information. Different protocols can be used in cases where the protocol used for discovery is not capable to transfer the configuration information.

After the new device has received the configuration information, the new device can act as a replacement or a clone for the "old" cooperating device. In other words, the new device is intended to replace one of the existing or previous cooperating devices of the machine or is intended to be a clone (i.e. an identical copy) of one of the existing or previous cooperating devices.

In the following, further aspects of the method of the invention will be described.

Preferably, the machine comprises the root device. In other words, the root device can be a device of the machine (e.g. a cooperating device). Alternatively, the root device may be formed by any other hardware (e.g. a computer in the fog or in the cloud).

By storing the data model in the root device, the root device holds a database of configuration information for the cooperating devices. Particularly, the data model is stored in a memory of the root device. In case a new device is connected to the machine (and thereby also connected to the root device), the root device can transfer the respective configuration information to the new device, preferably at any time without the need to read the configuration information from the old device or using a PC (Personal Computer) with engineering tools at the time when the configuration information is written to the new device. Once the new device has received the configuration information, the new device preferably has the same configuration as the corresponding cooperating device. Thus, the new device can then seamlessly replace the cooperating device or function as a clone of the cooperating device, wherein the clone can be used in a further machine. Furthermore, the method of the invention can also be used to clone the whole machine, i.e. to clone all devices of the machine.

The machine can be the above-mentioned engineering prototype of the machine.

The new device can preferably be at least substantially identical in its hardware to one of the cooperating devices. Also, the new device can be a legacy device to one of the cooperating devices or the cooperating device can be a legacy device to the new device.

The provision of the data model (which could also be termed a Machine Data Model—MDM) allows to significantly reduce the steps required for replacing a device and/or cloning a machine or devices of the machine, as the configuration information is present for the cooperating devices in a central storage. Thereby the replacement of a device and/or cloning of a machine or of devices of the machine is significantly faster and requires less effort.

The data model (MDM) can also store previous versions of the configuration information of a respective cooperating device (i.e. a version history).

Furthermore, due to the centralized data model in the root device it is possible to have one single controlling software running on the root device that performs the steps required for the replacement and/or cloning of a device. This software can be named a "machine assistant". It is an advantage of the invention that only one centralized software may be required which may be running on the root device, preferably without requiring installation, instead of different software for different devices and instead of software tools that need to be installed on an engineering PC. The controlling software (i.e. the machine assistant) may be configured to guide a user step by step through the process of replacing and/or cloning devices. The controlling software (i.e. the machine assistant) can have a user interface which guides a user through any necessary steps, as mentioned before. Alternatively, the controlling software or the root device may perform the steps described herein in an automatic manner. The controlling software can be pre-installed on the root device, thereby further reducing the steps necessary to replace and/or clone a device.

The controlling software and/or the root device can also comprise a machine configuration server (MCS). The machine configuration server can be implemented on the hardware and/or firmware of the root device. The machine configuration server can comprise the data model and may be an embedded information repository for the machine and its devices. As an advantage, a user does not need to manage and distribute the information in the data model as this can be achieved by the machine configuration server.

The root device can comprise a control unit (e.g. a CPU—Central Processing Unit), a data storage for the data model (e.g. a flash memory or a hard drive) and input-output-means for communicating with the (other) cooperating devices. The root device may be one of the cooperating devices. The cooperating devices preferably work together to realize the functions of the machine.

The devices of the machine can be interconnected via a field bus. Also, Ethernet or industrial Ethernet connections (e.g. Sercos III and/or EtherNet/IP and/or ProfiNet) can be used. A "connection" is to be understood as a "data connection", i.e. a connection that allows transmitting digital data. In the same way, the term "connected" as used herein is to be understood as "connected using a data connection".

The data model comprises configuration information of at least some of the cooperating devices. Alternatively, the data model can comprise configuration information of all of the cooperating devices.

Advantageously, the method further comprises
connecting the new device to the machine, wherein the new device corresponds to one of the devices present in the data model,
transferring the configuration information from the root device to the new device, wherein after the transfer of the configuration information, the new device is able to perform at least some of the functions of the cooperating device corresponding to the new device. Preferably, the new device is able to perform all of the functions of the cooperating device corresponding to the new device, after the transfer of the configuration information.

As already mentioned above, the new device can be connected such that it establishes a data connection to the machine and the root device. The data connection can then be used to transfer the configuration data to the new device. After the transfer of the configuration data, the new device is substantially identical (e.g. in its firmware and/or settings) to the corresponding cooperating device. A device being present in the data model means that its configuration information is stored in the data model. The devices present in the data model can be the cooperating devices and the root device.

As an example, if a servo drive (i.e. a cooperating device) of the machine is broken and has to be replaced, a new servo drive (i.e. a new device) is connected to the machine. The new servo drive corresponds to the "old" servo drive (i.e. has identical hardware), wherein the old servo drive is present in the data model. After connecting the new servo drive to the machine, the root device transfers the configuration information (e.g. the firmware and device parameters of the "old" servo drive) that is stored in the data model to the new servo drive, thereby initializing the new servo drive with the same parameters as the old servo drive (e.g. identical parameters for acceleration, maximum speed, etc.). The new servo drive can then immediately replace the old servo drive, thus reducing downtime of the machine. In general, a firmware and corresponding parameters of a cooperating device can be stored in the data model during the discovery process—or the firmware and corresponding parameters can be transferred to the root device from an engineering software (when the machine prototype is developed) or copied from the root device of another machine (when the machine is cloned). This firmware and corresponding parameters can later be transferred to the new device.

From the above example, it is apparent that the replacement of a device is possible even when the old device does not function anymore and does not allow a readout of its parameters anymore, since the parameters of the old device are stored as configuration information in the data model.

The parameters can be adapted to indicate the role and/or task of each cooperating device within the machine.

Preferably the root device performs the discovery of the cooperating devices before the new device is connected to the machine. During the discovery process the data model is filled with configuration information about the different cooperating devices of the machine. The discovery can be performed automatically by the root device. Particularly, the root device can scan the machine for other devices, as has been laid out above. When another device (i.e. a cooperating device) is found, the found device and its configuration information are added to the data model—or the data model can be updated to reflect that the new device replaces an old device (this action might require user confirmation and/or assignment by the user which new device replaces which cooperating device). After a cooperating device has been found, the root device will download the current configuration (e.g. a firmware) of the found device and will store the configuration as configuration information in the data model. This process is repeated until the root device cannot find further cooperating devices.

When the root device finds a cooperating device that itself is connected to further devices (e.g. if the found device is a programmable logic controller (PLC) connected to further cooperating devices), the root device requests the found PLC/device to provide a list of all devices connected to the PLC and to provide the configuration information of all devices connected to the PLC. In order to provide this information the PLC may perform its own scan to create the information required by the root device.

The described discovery can be performed fully automatically by the root device. During the discovery, the root device learns from the cooperating devices and discovers the structure of the machine.

After the data model is completed, a list of all found devices can be shown to a user, wherein the user can then decide which devices should be included or maintained in the data model.

Advantageously, upon discovery of a cooperating device, a new instance for the respective cooperating device is established in the data model. Within the data model an instance (i.e. a set of configuration information) can be added for each newly found cooperating device. For example, the data model can have an instance for the root device, an instance for the first found cooperating device and an instance for each further cooperating device.

Within each instance of the configuration information, information about a network configuration, a controller identification, a firmware version number and/or a device identification can be included. Furthermore, information on Fast Device Replacement (FDR) configurations of a respective cooperating device can be included in the configuration information.

The use of instances for the different devices permits to describe the machine in a generic way. Particularly, the data model can use a semantic, in order to add a meaning to different parts of the configuration data (e.g. "Firmware", "Parameters" or "Device Identification"). This allows the data model to be easily understandable and to be transferred to further applications, such as engineering tools. Furthermore, this semantic approach can make the machine self-descriptive (i.e. the information describing the machine is stored within the machine).

The data model can also comprise information about the whole machine. This information can be defined during engineering and/or production of the machine and comprise e.g. a machine identification, a machine picture and/or information about the machine topology.

The data model can e.g. be stored in an XML-file (eXtendable Markup Language-file) and/or a database (e.g. an SQL-database).

It is preferred that during the discovery, broadcast messages, e.g. sent by the root device, are used for detecting at least some of the cooperating devices. The broadcast messages can be received by some or every cooperating device in the machine, prompting the cooperating devices to respond to the root device. Using the responses, the root device can identify and/or discover the cooperating devices. The broadcast messages can subsequently be sent using different communication protocols.

Preferably, the discovery uses DPWS (device profile web service) and/or the Sercos protocol to discover the cooperating devices. Additionally or alternatively vendor specific proprietary protocols can be used (e.g. the Netmanage protocol), to discover devices that do not support standardized discovery protocols. DPWS is a profile of Web Services protocol that allows secure Web Service messaging and discovery. The mentioned protocols and tools allow an automatic discovery of the cooperating devices.

Preferably the root device runs a webserver that hosts a website which allows controlling the replacing and/or cloning of cooperating devices. Due to the webserver, the replacing and/or cloning of devices can be controlled from any computer or even a handheld Tablet-PC or smartphone that is able to process the website. The above-mentioned user interface can be formed by the website.

The website can comprise an engineering tool or a programming environment that allows amending or changing the software, firmware and/or parameters of the cooperating devices (i.e. the software, firmware and/or parameters stored in the data model). Thereby, the need to install specific software, e.g. an engineering tool, is eliminated.

Further preferably, the data model is updated continuously and/or automatically. For this purpose, the root device may perform the discovery repeatedly, e.g. within predefined time intervals. Thereby the data model is always up to date and changes of the configuration information of a device are immediately and/or automatically mapped in the data model.

It is further preferred if the configuration information of a respective device comprises a device firmware, a device firmware version, a device software, a device software version, communication settings and/or parameters of the device. All this mentioned information can be stored in the data model in the root device. E.g. by transferring a firmware and parameters to a new device, the new device can then perform all functions of the (previous) cooperating device.

Advantageously, replacing a device of the machine includes disconnecting the device to be replaced from the machine, before the new device is connected to the machine. In other words, the cooperating device that is to be replaced is first disconnected from the machine. After that the new device can be connected instead of the disconnected device.

Further advantageously, cloning a device of the machine includes transferring the data model from the root device to a new root device, wherein the new device that is intended to act as clone is then connected to the new root device and the new root device transfers the respective configuration information to the new device. In other words, the data model can be copied onto the new root device. This allows the cloning of the complete machine. For this purpose the new root device can be connected to the (initial) root device in order to copy the data model onto the new root device, wherein preferably no connection to the cooperating devices of the (original) machine is necessary, as all the required information can be obtained from the root device of the (original) machine. New devices which preferably are identical in their hardware to the cooperating devices can then be connected to the new root device. The new root device can then transfer the respective configuration information to each of the new devices. After the transfer of the configuration information to the new devices is completed, an identical copy (i.e. a clone) of the machine has been created.

Advantageously, the cloning of the machine can be repeated to produce a series of machines. Also, the cloning of the machine can start from an engineering prototype of the machine.

Preferably, the new device is automatically detected by the root device and the configuration information is transferred to the new device in an automatic manner. For example, if a device is disconnected and replaced by a new device, the root device can recognize that a new device is present, when the root device performs the discovery process. At the same time the root device can recognize that one of the cooperating devices is missing and has been replaced with the new device. The root device can then, preferably automatically, transfer the configuration information to the new device. The root device may nonetheless prompt a user for confirmation (and potentially authentication) before transferring the configuration information to the new device, in order to enhance safety & security. Advantageously, a manual (and potentially error prone) process is replaced by a single confirmation step in an otherwise automated process.

Advantageously, an identification of the new device is determined and the configuration information required by the new device is determined based on the identification. For example, if the identification of the new device indicates that the new device is a servo drive of a certain model, the root device can search in the data model for the configuration information for a servo drive of that model. Once the respective configuration information has been found, the configuration information can be transferred to the new device. After the transfer of the configuration information, the new device and/or the cloned machine can be used in a mechanic working process, e.g. for the production or assembly of a product.

The invention also relates to a root device which is adapted to execute the method as disclosed above, when the root device is connected to one or more cooperating devices and at least one new device.

The invention further relates to a machine comprising several cooperating devices, wherein the machine comprises a root device, wherein the root device comprises a data connection to the (other) cooperating devices, and wherein the root device comprises a data model which comprises configuration information of at least some of the cooperating devices. The root device is adapted to perform a discovery using different communication protocols for detecting at least some of the cooperating devices. The root device is further adapted to gather the configuration information of at least some of the detected devices and to store the configuration information in the data model. Furthermore, the root device is configured to be connected to a new device and to transfer at least part of the configuration information onto the new device.

Preferably, the root device, the cooperating devices and/or the new device are a Programmable Logic Controller (PLC), an actuator and/or a sensor, particularly a servo drive and/or an IO-device (input-output-device).

The advantages, preferable features and/or embodiments of the inventive method described in the foregoing also apply to the inventive machine.

Figure 2:
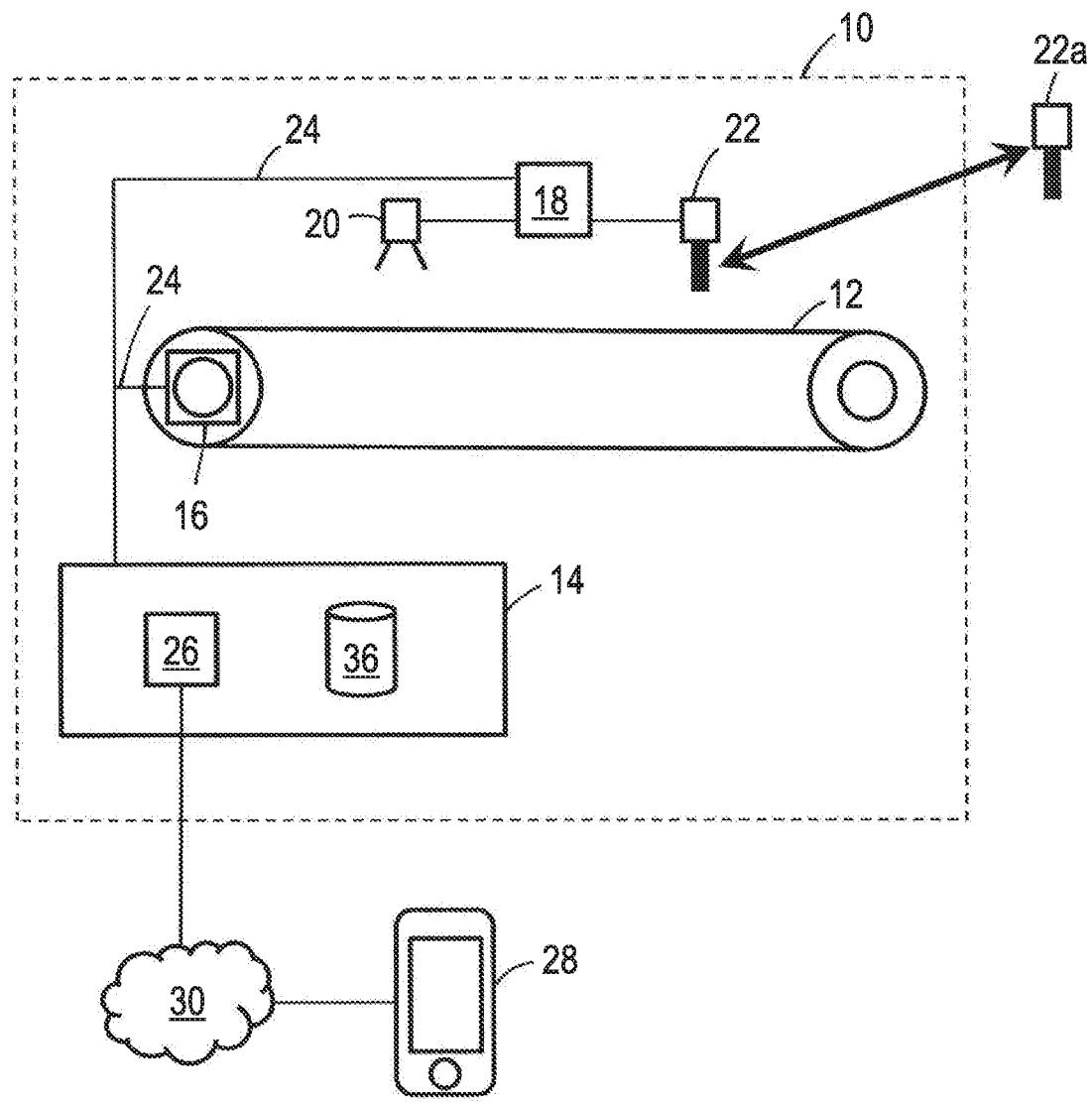
Figure 3:
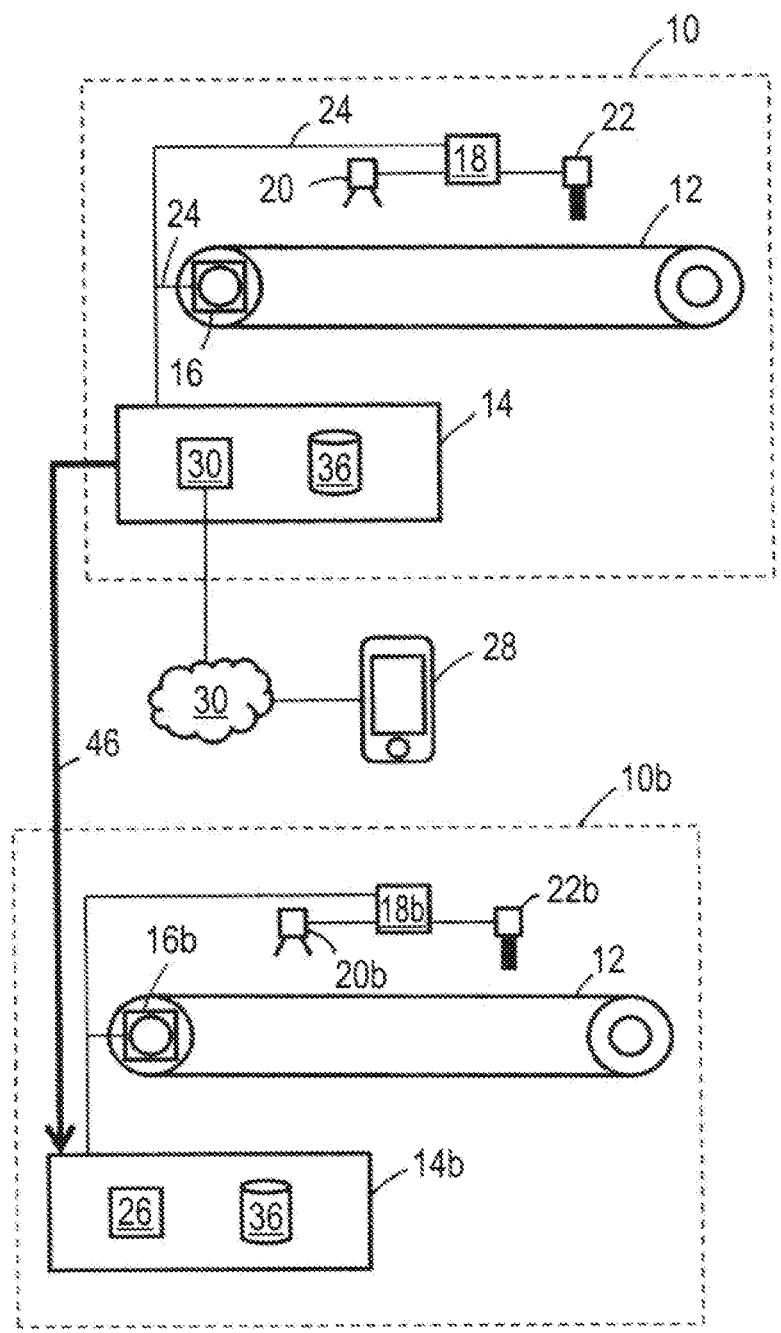
Figure 4:
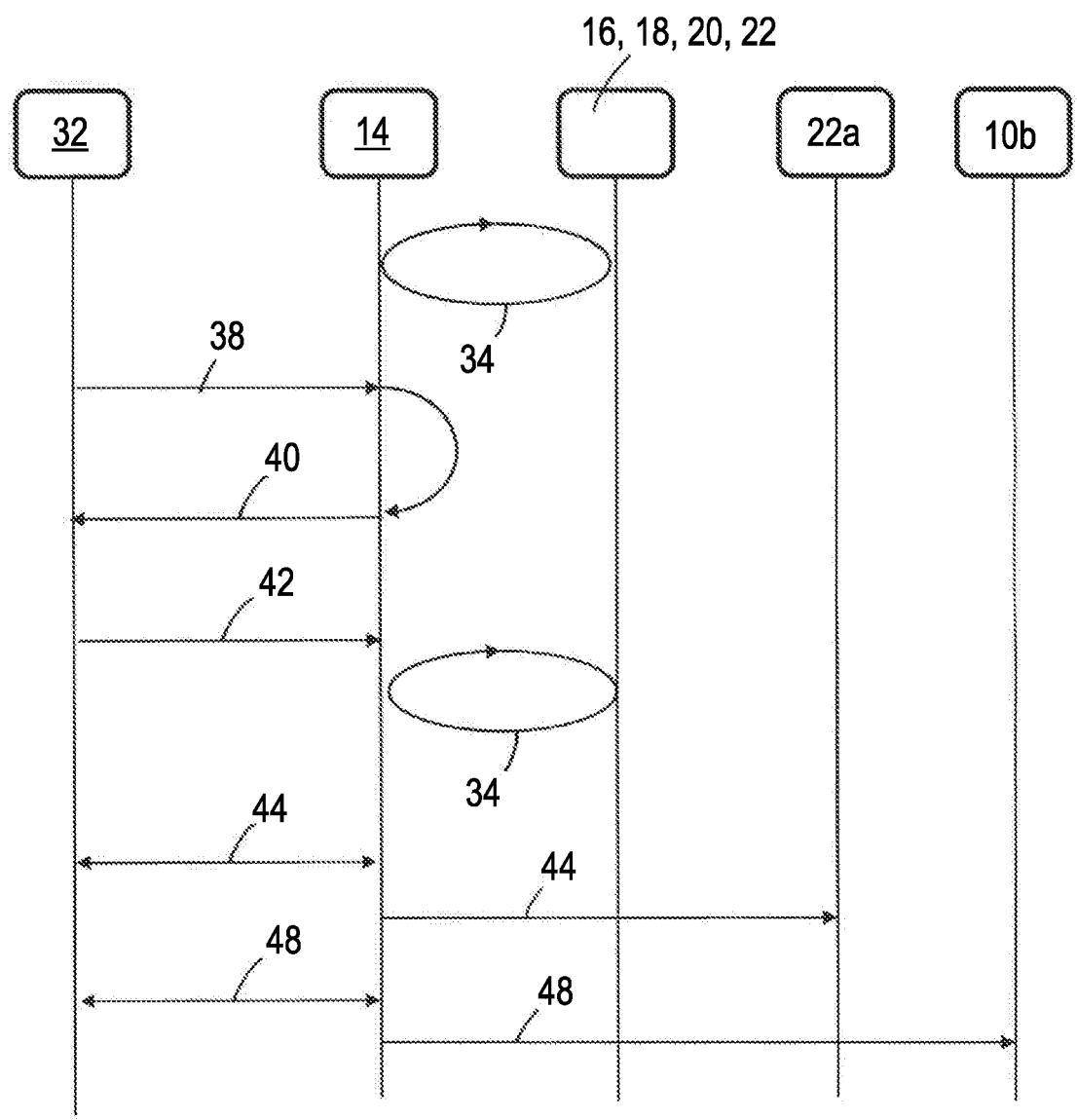

The invention will be explained in the following in detail by means of exemplary embodiments and with reference to the Figures:

FIG. 1 shows a machine comprising several devices;
FIG. 2 shows the replacement of a device of the machine of FIG. 1;
FIG. 3 shows the cloning of the machine of FIG. 1; and
FIG. 4 shows a schematic overview over the replacement and cloning of devices.

FIG. 1 shows a machine 10 for an industrial process. The machine 10 comprises a conveyor belt 12 that transports products (not shown). The machine 10 comprises a first Programmable Logic Controller (PLC) which acts as a root device 14.

The conveyor belt 12 is driven by a servo drive 16. The machine 10 comprises a second PLC 18 that is directly connected to an optical sensor 20 and an electric drill 22. The second PLC 18 is connected to the root device 14. The root device 14 is also connected to the servo drive 16. The servo drive 16, the second PLC 18, the optical sensor 20 and the electric drill 22 are cooperating devices. The cooperating devices 16, 18, 20, 22 are connected to each other and to the root device 14 via Ethernet connections 24.

During operation of the machine 10, the root device 14 controls the operation of the servo drive 16 and (via the second PLC 18) the optical sensor 20 and the electric drill 22.

The root device 14 runs a webserver 26 to which a mobile device, depicted as Tablet-PC 28, is connected via a wireless network and/or an Internet connection 30.

During the operation of the machine, the root device 14 collects information about the cooperating devices 16, 18, 20, 22, as is shown in FIG. 4. FIG. 4 schematically shows a user 32 that operates the Tablet-PC 28, the root device 14 and the cooperating devices 16, 18, 20, 22.

As depicted in FIG. 4, the root device 14 continuously and automatically performs a discovery process 34 using different communication protocols during which the cooperating devices 16, 18, 20, 22 are discovered and their respective firmware and used parameters are downloaded to a data model 36 (FIG. 1) which is stored in the root device 14.

The optical sensor 20 and the electric drill 22 use an Ethernet-based fieldbus protocol for communication, whereas the servo drive 16 and the second PLC 18 utilize the TCP protocol. During the discovery process 34 the root device 14 therefore utilizes different field bus protocols and different Internet-Protocol (IP)-based protocols to discover all cooperating devices 16, 18, 20, 22.

After all cooperating devices 16, 18, 20, 22 have been found the user 32 can use a request 38 to be shown all discovered devices 16, 18, 20, 22. The root device 14 then checks the data model 36 and uses an acknowledgement 40 to show to the user all found cooperating devices 16, 18, 20, 22. The user can then use a configuration command 42 to change the configuration of the cooperating devices 16, 18, 20, 22 or remove some of the found devices 16, 18, 20, 22 from the data model 36. Thereafter, the root device 14 resumes the discovery process 34 periodically and updates the data model 36, if necessary.

Reference is now made to FIG. 2. FIG. 2 shows a new electric drill 22a which is intended to replace the electric drill 22, if e.g. the electric drill 22 has broken down.

After the new electric drill 22a has mechanically replaced the electric drill 22 and is connected to the second PLC 18, the root device 14 can automatically detect during the discovery process 34 that the electric drill 22 is not present anymore but has been replaced by the new electric drill 22a. The root device 14 can then transfer configuration information from the data model 36 to the new electric drill 22a, thereby allowing the new electric drill 22a to perform the same functions as the electric drill 22.

Alternatively, as shown in FIG. 4, the user 32 can be prompted to accept the replacement of the electric drill 22 with the new electric drill 22a. The user 32 can then use a replace command 44 which is sent from the Tablet-PC 28 to the root device 14. The replace command 44 triggers the root device 14 to transfer the configuration information from the data model 36 to the new electric drill 22a.

Reference is now made to FIG. 3. FIG. 3 shows the machine 10 of FIG. 1 and a cloned machine 10b. The cloned machine 10b is identical in its hardware with the machine 10. The cloned machine 10b comprises a new root device 14b that has a data connection 46 to the root device 14. Using the data connection 46 the data model 36 is transferred to a new root device 14b. The new root device 14b then performs a discovery process 34 thereby discovering a new servo drive 16b, a new second PLC 18b, a new optical sensor 20b and a new electric drill 22b. The new root device 14b can then transfer the respective configuration information from the data model 36 to the respective new cooperating device 16b, 18b, 20b, 22b. After the transfer of this configuration information, an identical copy of the machine 10 has been created.

Alternatively, as shown in FIG. 4, the user 32 can be prompted to allow the cloning of the machine 10. The user 32 can then use a clone command 48 to start the transfer of the data model 36 to the new root device 14b which then results in the cloning of the machine 10 as described above.

Due to the data model 36 which is stored in a centralized manner in the root device 14 and due to use of different communication protocols during discovery, a fast and easy replacement and/or cloning of devices 16, 18, 20, 22 or even of the whole machine 10 is possible.

LIST OF REFERENCE SIGNS 10 machine
12 conveyor belt
14 root device
14b new root device
16 servo drive
16b new servo drive
18 second PLC
18b new second PLC
20 optical sensor
20b new optical sensor
22 electric drill
22a, 22b new electric drill
24 Ethernet connection
26 webserver
28 Tablet-PC
30 Internet connection
32 user
34 discovery process
36 data model
38 request
40 acknowledgement
42 configuration command
44 replace command
46 data connection
48 clone command

The invention claimed is:

1. A method for replacing and/or cloning at least one device of a machine, the machine comprising a plurality of cooperating devices, and a root device, the root device comprising a data connection to the cooperating devices, executing a webserver hosting a website, and storing a data model, the data model comprising configuration information of at least one of the cooperating devices, wherein the method comprises:
    performing, by the webserver, a discovery using different communication protocols to detect at least one of the cooperating devices,
    gathering, from at least one device of the detected at least one of the cooperating devices, the configuration information of the at least one device, the gathered configuration information being at least one of device firmware, a device firmware version, device software, and a device software version of the at least one device, and storing the configuration information in the data model, and
    transferring, by the webserver, at least part of the gathered configuration information onto a new device,
    wherein the website hosted by the webserver allows modifying the gathered configuration information of the cooperating devices that is stored in the data model.

2. The method in accordance with claim 1, further comprising:
    connecting the new device to the machine, wherein the new device corresponds to a particular device of the cooperating devices having particular configuration information stored in the data model, and
    transferring the stored particular configuration information from the root device to the new device, wherein after the transfer of the particular configuration information, the new device is configured to perform at least one function of the particular device corresponding to the new device.

3. The method in accordance with claim 1, further comprising performing, by the root device, the discovery of the cooperating devices, before the new device is connected to the machine.

4. The method in accordance with claim 1, further comprising, upon discovery of a particular cooperating device, establishing a new instance for the particular cooperating device in the data model.

5. The method in accordance with claim 1, wherein the step of performing the discovery comprises using broadcast messages to detect at least one of the cooperating devices.

6. The method in accordance with claim 1, wherein the step of performing the discovery comprises using at least one of DPWS (Device Profile Web Service) and a SERCOS protocol to discover the cooperating devices.

7. The method in accordance with claim 1, further comprising updating the data model at least one of continuously and automatically.

8. The method in accordance with claim 1, further comprising disconnecting, from the machine, a particular device to be replaced, before the new device is connected to the machine so as to replace the particular device.

9. The method in accordance with claim 1, wherein the transferring step comprises transferring the data model from the root device to a new root device, connecting the new device to the new root device, and transferring the at least part of the configuration information from the new root device to the new device.

10. The method in accordance with claim 1, further comprising automatically detecting the new device and transferring the at least part of the configuration information to the new device in an automatic manner.

11. The method in accordance with claim 1, further comprising determining an identification of the new device and determining the configuration information required by the new device based on the identification.

12. The method of claim 1, wherein the website hosted by the webserver executed by the root device allows a user of the website to control the replacing and/or cloning of the cooperating devices.

13. The method of claim 1, wherein the website hosted by the webserver allows modifying the firmware of any one of the cooperating devices, the firmware being stored in the data model of the root device.

14. A root device to execute a method for replacing and/or cloning at least one device of a machine when the root device is connected to one or more cooperating devices of the machine, the machine comprising a plurality of the cooperating devices, the root device comprising:
    a data connection to the cooperating devices,
    a memory storing a data model, the data model comprising configuration information of at least one of the cooperating devices, and circuitry configured to
- execute a webserver that hosts a website,
- perform, by the webserver, a discovery using different communication protocols to detect at least one of the cooperating devices,
- gather, from at least one device of the detected at least one of the cooperating devices, the configuration information of the at least one device, the gathered configuration information being at least one of device firmware, a device firmware version, device software, and a device software version of the at least one device, and store the configuration information in the data model, and
- transfer, by the webserver, at least part of the configuration information onto a new device,
- wherein the website hosted by the webserver allows modifying the gathered configuration information of the cooperating devices that is stored in the data model.

15. A system, comprising:
a plurality of cooperating devices; and
a root device,
wherein the root device includes a data connection to the cooperating devices, and a memory storing a data model that includes configuration information of at least one of the cooperating devices, and
the root device is configured to
- execute a webserver that hosts a website that allows controlling of the replacing and/or cloning of the cooperating devices,
- perform, by the webserver, a discovery using different communication protocols to detect at least one of the cooperating devices,
- gather, from at least one device of the detected at least one of the cooperating devices, the configuration information of the at least one device, the gathered configuration information being at least one of device firmware, a device firmware version, device software, and a device software version of the at least one device, and store the configuration information in the data model, and
- connect to a new device and transfer, by the webserver, at least part of the gathered configuration information onto the new device,
- wherein the website hosted by the webserver allows modifying the gathered configuration information of the cooperating devices that is stored in the data model.

16. A method for replacing and/or cloning at least one device of a machine, the machine comprising a plurality of cooperating devices, and a root device, the root device comprising a data connection to the cooperating devices, and storing a data model, the data model comprising configuration information of at least one of the cooperating devices, wherein the method comprises:
- performing, by the root device, a discovery using different communication protocols to detect at least one of the cooperating devices,
- gathering the configuration information of at least one device of the detected devices, the configuration information being at least one of device firmware, a device firmware version, device software, and a device software version of the at least one device, and storing the configuration information in the data model, and
- transferring the data model from the root device to a new root device, connecting a new device to the new root device, and transferring the at least part of the configuration information from the new root device to the new device.

* * * * *